United States Patent Office 3,199,254
Patented Aug. 10, 1965

3,199,254
DIAMOND COATED ENDLESS BAND AND WIRE
SAW BLADES OF BERYLLIUM-COBALT-COPPER
ALLOY
Lee H. Barron, 612 W. Elk Ave., Glendale 4, Calif.
No Drawing. Filed June 26, 1961, Ser. No. 119,304
3 Claims. (Cl. 51—309)

This invention relates to endless band saw and wire saw blades of beryllium-copper alloy having diamond grits attached to the surfaces by an electroplate of nickel.

The principal object of the inventon is to provide improved diamond coated band saws and wire saws having longer lives and being relatively free from breakage due to embrittlement of the bands.

Steel saw blades having diamond grits attached to their surfaces by a nickel electroplate have heretofore been made and used. Endless steel saw bands and wire become brittle during use due to metal fatigue, largely because of the constant bending as the band goes around the pulleys of the band saw machine, and the excessive twisting and straining to which the band is subjected by the pressure of the work piece as it is forced against the diamond coated edge or face of the band.

The fatigue and embrittlement of the steel band and wire from constant flexing is much increased if hydrogen has been introduced into the metal structure by the electroplating of the nickel coating which anchors the diamond grits. Electroplating, especially at voltages in excess of those required to electrodeposit the nickel, result in the generation and occlusion of hydrogen in the steel structure, and this is known to increase the rate of embrittlement due to flexure and strain in the use of the band saw.

I have discovered that when the steel blades and wires of diamond coated endless saws are replaced by beryllium-cobalt-copper alloy blades and wire, that the life of the blades is greatly increased because there is no embrittlement due to bending and flexure. Because of the use of the beryllium-cobalt-copper alloy there is no embrittlement due to the generation and internal occlusion of hydrogen, as there is in steel bands.

The preferred beryllium-cobalt-copper alloy, (usually called "beryllium copper" in the trade) contains 1.80 to 2.05 percent beryllium, 0.18 to 0.30 percent cobalt, and the balance copper. This alloy is made into the desired strips by rolling and wiredrawing, and is preferably "half hardened" (about Rockwell B 88–96) prior to the diamond coating, using a process of electrodeposition of nickel around the reposed diamond grits to give the desired diamond coating, as described in my Patents No. 2,784,536 and No. 2,924,050. Other beryllium-cobalt-copper alloy of slightly different compositions may also be used.

After attaching the diamond coating by electroplating, the coated blades or wires are tempered to spring temper (about Rockwell C–40) by heating them to about 700° F. for one-half hour and then air cooling. The diamond coated bands with electrodeposited nickel holding the diamond grits become softer with use, and may be re-tempered if desired.

The beryllium-cobalt-copper alloy may be used for diamond coated band and wire saws in any desired sizes, in continuous edge coating, segment edge coating or fully coated with respect to diamond grits. The bands may be readily joined by the use of silver solder, using feather edged, lapped ends. In comparable sizes and coatings, compared to steel bands and wires, the saws have much longer useful lives and are relatively free from breakage because work-hardening and hydrogen embrittlement are completely eliminated. Because of freedom from band breaking, there is much less lost time in repairing broken bands.

Where the word "band" saw is used in the following claims it is to be understood that strips of any width, and thickness and shape, including wires which may be single strands, or twisted, or braided cables, are included.

I claim:

1. A non-embrittling diamond band saw comprising a beryllium-cobalt-copper alloy strip, said strip consisting of 1.80 to 2.05% berryllium, 0.18 to 0.30% cobalt, and the balance being substantially copper, having on its working surface a coating of diamond grit held in place by an eletcrodeposited coating of nickel.

2. The non-embrittling band saw defined in claim 1, in which the diamond coated band saw has been tempered to a spring temper.

3. A metal strip for a diamond coated band saw which softens with use, whose diamond grits are attached thereto in segments on the edge thereof, by an electroplate of nickel, said strip being composed of a beryllium-cobalt-copper alloy, consisting of 1.80 to 2.05% beryllium, 0.18 to .30% cobalt and the balance being copper, said strip being heat treatable to a hardness of about C–40 Rockwell, and being characterized by becoming softer when repeatedly flexed as in its use as a band saw.

References Cited by the Examiner

UNITED STATES PATENTS

| | | | |
|---|---|---|---|
| 2,187,743 | 1/40 | Kirchner et al. | 51—188 |
| 2,192,495 | 3/40 | Hessenbruch | 75—153 |
| 2,292,991 | 8/42 | Crompton | 51—309 |
| 2,380,506 | 7/45 | Donachie | 75—153 |
| 2,712,988 | 7/55 | Kurtz | 51—309 |
| 2,784,536 | 3/57 | Barron | 51—309 |

ALEXANDER H. BRODMERKEL, *Primary Examiner.*

JOHN R. SPECK, MORRIS LIEBMAN, *Examiners.*